(12) United States Patent
Chen

(10) Patent No.: US 7,905,644 B2
(45) Date of Patent: Mar. 15, 2011

(54) SYSTEM IN PACKAGE HIGH POWER HIGH EFFICIENCY LIGHT-EMITTING DIODE LAMP

(75) Inventor: Jen-Shyan Chen, Hsinchu (TW)

(73) Assignee: Neobulb Technologies, Inc., Bandar Seri Hegawan (BN)

( * ) Notice: Subject to any disclaimer, the term of this patent is extended or adjusted under 35 U.S.C. 154(b) by 170 days.

(21) Appl. No.: 11/990,599

(22) PCT Filed: Aug. 19, 2005

(86) PCT No.: PCT/CN2005/001302
§ 371 (c)(1),
(2), (4) Date: Feb. 19, 2008

(87) PCT Pub. No.: WO2007/019734
PCT Pub. Date: Feb. 22, 2007

(65) Prior Publication Data
US 2009/0034250 A1    Feb. 5, 2009

(30) Foreign Application Priority Data

Aug. 19, 2005  (CN) .......................... 2005 1 0092113

(51) Int. Cl.
*F21V 7/04*  (2006.01)
*F21V 33/00* (2006.01)
*F21V 29/00* (2006.01)
(52) U.S. Cl. ......... 362/555; 362/234; 362/294; 362/612
(58) Field of Classification Search .................. 362/218, 362/223, 555, 612, 234, 294, 580
See application file for complete search history.

(56) References Cited

U.S. PATENT DOCUMENTS

| | | | | |
|---|---|---|---|---|
| 6,582,095 | B1 * | 6/2003 | Toyoda | 362/235 |
| 6,692,251 | B1 * | 2/2004 | Logan et al. | 433/29 |
| 6,786,626 | B2 * | 9/2004 | Wu et al. | 362/555 |
| 6,897,486 | B2 * | 5/2005 | Loh | 257/81 |
| 6,910,794 | B2 * | 6/2005 | Rice | 362/547 |
| 7,168,842 | B2 * | 1/2007 | Chou et al. | 362/631 |
| 7,270,446 | B2 * | 9/2007 | Chang et al. | 362/294 |
| 7,284,874 | B2 * | 10/2007 | Jeong et al. | 362/97.1 |

(Continued)

FOREIGN PATENT DOCUMENTS

CN    1605795 A    10/2004

(Continued)

OTHER PUBLICATIONS

International Search Report of PCT/CN2005/001302 mailed May 18, 2006.

*Primary Examiner* — Jong-Suk (James) Lee
*Assistant Examiner* — David R Crowe
(74) *Attorney, Agent, or Firm* — Banger Shia

(57) ABSTRACT

The invention provides a system-in-package, high power, and highly efficient light-emitting diode lamp. The light-emitting diode lamp, according to the invention, includes a light-guiding device. At least one end of two ends of the light-guiding device, the light, converted by a diode light-emitting device from an electric energy, is emitted into, and then is guided by the light-guiding device outside. The heat generated during light-emitting of the diode light-emitting is conducted by a heat-conducting device from a flat portion thereof to at least one heat-dissipating fin and further dissipated by the at least one heat-dissipating fin.

5 Claims, 4 Drawing Sheets

U.S. PATENT DOCUMENTS

| | | | |
|---|---|---|---|
| 7,314,291 B2 * | 1/2008 | Tain et al. | 362/294 |
| 7,345,320 B2 * | 3/2008 | Dahm | 257/99 |
| 7,438,448 B2 * | 10/2008 | Chen | 362/373 |
| 2006/0001384 A1 | 1/2006 | Tain et al. | |
| 2007/0025119 A1 * | 2/2007 | Chang-Jien et al. | 362/555 |

FOREIGN PATENT DOCUMENTS

| | | |
|---|---|---|
| CN | 1637343 A | 1/2005 |
| CN | 1637343 A | 7/2005 |

* cited by examiner

SYSTEM IN PACKAGE HIGH POWER HIGH EFFICIENCY LIGHT-EMITTING DIODE LAMP

BACKGROUND OF THE INVENTION

1. Field of the Invention

This present invention relates to a light-emitting diode lamp, and more particularly, to a system-in-package, high power, and highly efficient light-emitting diode lamp.

2. Description of the Prior Art

Because light-emitting diodes have advantages of electricity-saving, vibration-resisting, fast responding, and being suitable for mass production etc, illuminating equipments using light-emitting diode as light sources continue to be investigated and developed. However, current light-emitting diodes have the problem of over-heating after being used for a long span of time, causing the reduction of lighting efficiency of light-emitting diodes and limiting the brightness. For this reason, all kinds of products applying light-emitting diodes require good heat-dissipating mechanisms.

Accordingly, a scope of the invention is to provide a system-in-package, high power, and highly efficient light-emitting diode lamp capable of solving the heat-dissipating problem in the prior art. More particularly, the light-emitting diode lamp, according to the invention, includes a light-guiding device capable of guiding the light, emitted into the light-emitting device, to the outside in single or multiple directions, so as to extend the point light source generated by the light-emitting device to a stable line or in a plane.

SUMMARY OF THE INVENTION

A scope of the invention is to provide a system-in-package, high power, and highly efficient light-emitting diode lamp. The light-emitting diode lamp of the preferred embodiment, according to the invention, includes a light-guiding device and a first packaged system. The light-guiding device has a first end and a second end. The first packaged system, mounted on the first end of the light-guiding device, includes a first heat conducting/dissipating module and a first diode light-emitting device. The first heat conducting/dissipating module includes a first heat-conducting device and at least one first heat-dissipating fin. The first heat-conducting device has a flat portion, and the at least one first heat-dissipating fin is mounted on a periphery of the first heat-conducting device. The first diode light-emitting device, mounted on the flat portion of the first heat-conducting device, is capable of being electrically connected to a power supply and converting a first electric energy supplied by the power supply into a first light. When the first diode light-emitting device emits the first light, the first light enters into the light-guiding device and is guided by the light-guiding device to the outside. A heat generated during the light-emitting of the first diode light-emitting device is conducted by the first heat-conducting device from the flat portion thereof to the at least one first heat-dissipating fin, and then it is dissipated by the at least one first heat-dissipating fin.

Another scope of the invention is to provide a diode lamp where the heat conducting/dissipating modules and the light-emitting device are packaged together and equipped with the light-guiding device. The heat generated by the light-emitting device can be dissipated to the atmosphere immediately by the heat-dissipating fins of the heat conducting/dissipating modules to greatly enhance the heat-dissipating efficiency. Moreover, the light-guiding device is capable of guiding the light, emitted into the light-emitting device, to the outside in single or multiple directions to extend the point light source generated by the light-emitting device to a stable line or in a plane.

The advantage and spirit of the invention may be understood by the following recitations together with the appended drawings.

BRIEF DESCRIPTION OF THE APPENDED DRAWINGS

DETAILED DESCRIPTION OF THE INVENTION

A scope of the invention is to provide a system-in-package, high power, and highly efficient light-emitting diode lamp.

Figure 1:
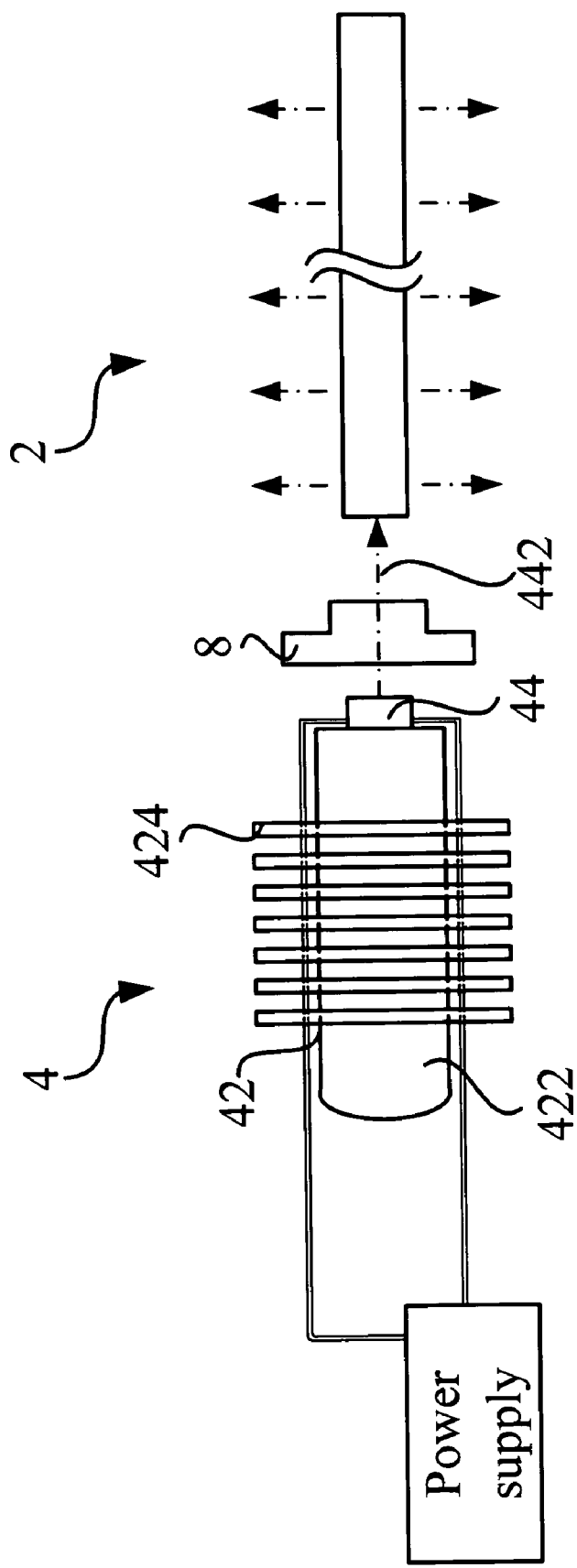
FIG. 1 is a schematic diagram of the light-emitting diode lamp of the preferred embodiment according to the invention.

Referring, to FIG. 1, FIG. 1 is a schematic diagram of the light-emitting diode lamp of the preferred embodiment according to the invention. The light-emitting diode lamp, according to the invention, includes a light-guiding device 2 and a first packaged system 4. The light-guiding device 2 has a first end and a second end. The first packaged system is mounted on the first end of the light-guiding device 2. The first packaged system 4 includes a first heat conducting/dissipating module 42 and a first diode light-emitting device 44. The first heat conducting/dissipating module 42 includes a first heat-conducting device 422 and at least one first heat-dissipating fin 424. The first heat-conducting device 422 has a flat portion, and the at least one first heat-dissipating fin 424 is mounted on a periphery of the first heat-conducting device 422. The first diode light-emitting device 44, mounted on the flat portion of the first heat-conducting device 422, is capable of being electrically connected to a power supply. The first diode light-emitting device 44 is capable of converting a first electric energy supplied by the power supply into a first light. When the first diode light-emitting device 44 emits the first light 442, the first light 442 enters into the light-guiding device 2 and is guided by the light-guiding device to the outside. The heat generated during the light-emitting of the first diode light-emitting device 44 is conducted by the first heat-conducting device 422 from the flat portion thereof to the at least one first heat-dissipating fin 424, and then it is dissipated by the at least one first heat-dissipating fin 424.

Figure 2:
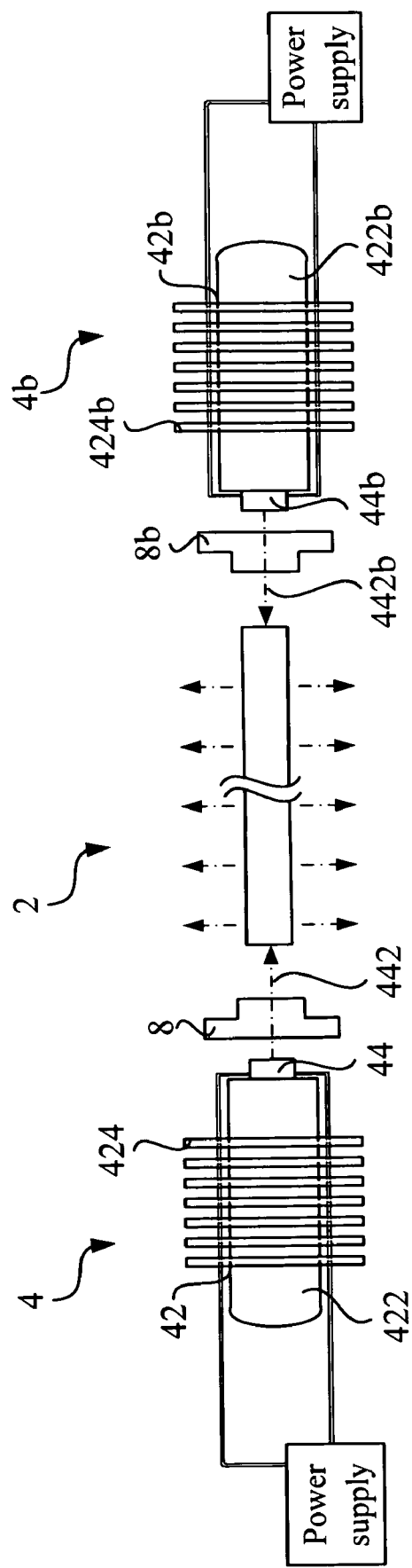
FIG. 2 is a schematic diagram of the light-emitting diode lamp of a preferred embodiment according to the invention.

Referring to FIG. 2, in a preferred embodiment, the light-emitting diode lamp further includes a second packaged system 4b. The second packaged system 4b, mounted on the second end of the light-guiding device 2, includes a second heat conducting/dissipating module 42b and a second diode light-emitting device 44b. The second heat conducting/dissipating module 42b includes a second heat-conducting device 422b and at least one second heat-dissipating fin 424b. The second heat-conducting device 422b has a flat portion, and the at least one second heat-dissipating fin 424b is mounted on a periphery of the second heat-conducting device 422b. The second diode light-emitting device 44b, mounted on the flat portion of the second heat-conducting device 42b, is capable of being electrically connected to the power supply. The second diode light-emitting device 44b is capable of converting a second electric energy supplied by the power supply into a second light 442b. When the second diode light-emitting device 44b emits the second light 442b, the second light 442b enters into the light-guiding device 2 and is guided by the light-guiding device to the outside. The heat generated during the light-emitting of the second diode light-emitting device 44b is conducted by the second heat-conducting device 422b from the flat portion thereof to the at least one second heat-dissipating fin 424b, and then it is dissipated by the at least one second heat-dissipating fin 424b.

Similarly, referring to FIG. 2, in another preferred embodiment, the light-emitting diode lamp according to the invention further includes a first sleeve 8 and a second sleeve 8b, where one end of the first sleeve 8 is adapted for the insertion of the first diode light-emitting device 44, and the other end of the first sleeve 8 is adapted for the insertion of the first end of the light-guiding device 2. One end of the second sleeve 8b is adapted for the insertion of the second diode light-emitting device 44b, and the other end of the second sleeve 8b is adapted for the insertion of the second end of the light-guiding device 2.

Figure 3:
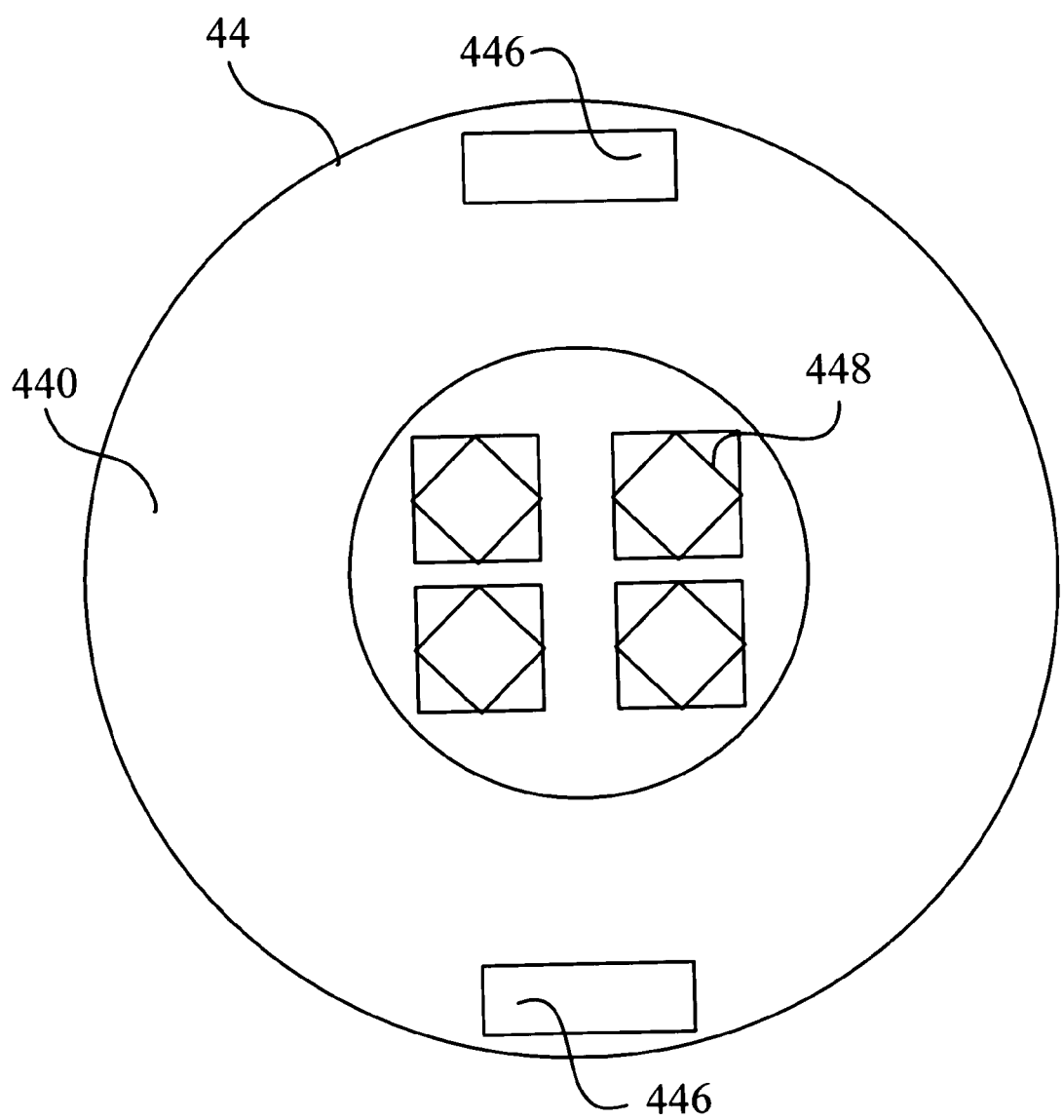
FIG. 3 is a structural view of the first diode light-emitting device of another preferred embodiment according to the invention.

Referring to FIG. 3, FIG. 3 is a structural view of the first diode light-emitting device of another preferred embodiment according to the invention. The first diode light-emitting device 44 includes a first substrate 440 formed of a semiconductor material, a metal material, a polymer material or a ceramic material, a first light-emitting module 448, and two first electrodes 446. The first light-emitting module 448 and the two first electrodes 446 are respectively disposed on the first substrate 440, and they are insulated. The first light-emitting module 448 is respectively connected to the two first electrodes 446. In another preferred embodiment, the second diode light-emitting device includes a second substrate formed of a semiconductor material, a metal material, a polymer material or a ceramic material, a second light-emitting module, and two second electrodes. The second light-emitting module and the two second electrodes are disposed on the second substrate in insulation. The second light-emitting module is respectively connected to the two second electrodes.

In another preferred embodiment, the first light-emitting module and the second light-emitting module respectively include at least one light-emitting diode or at least one laser diode.

In another preferred embodiment, the first heat-conducting device and the second heat-conducting device are respectively a heat pipe or a heat column. The first heat-conducting device and the second heat-conducting device are formed of a copper material, an aluminum material, or a material with high heat conductivity.

Figure 4:
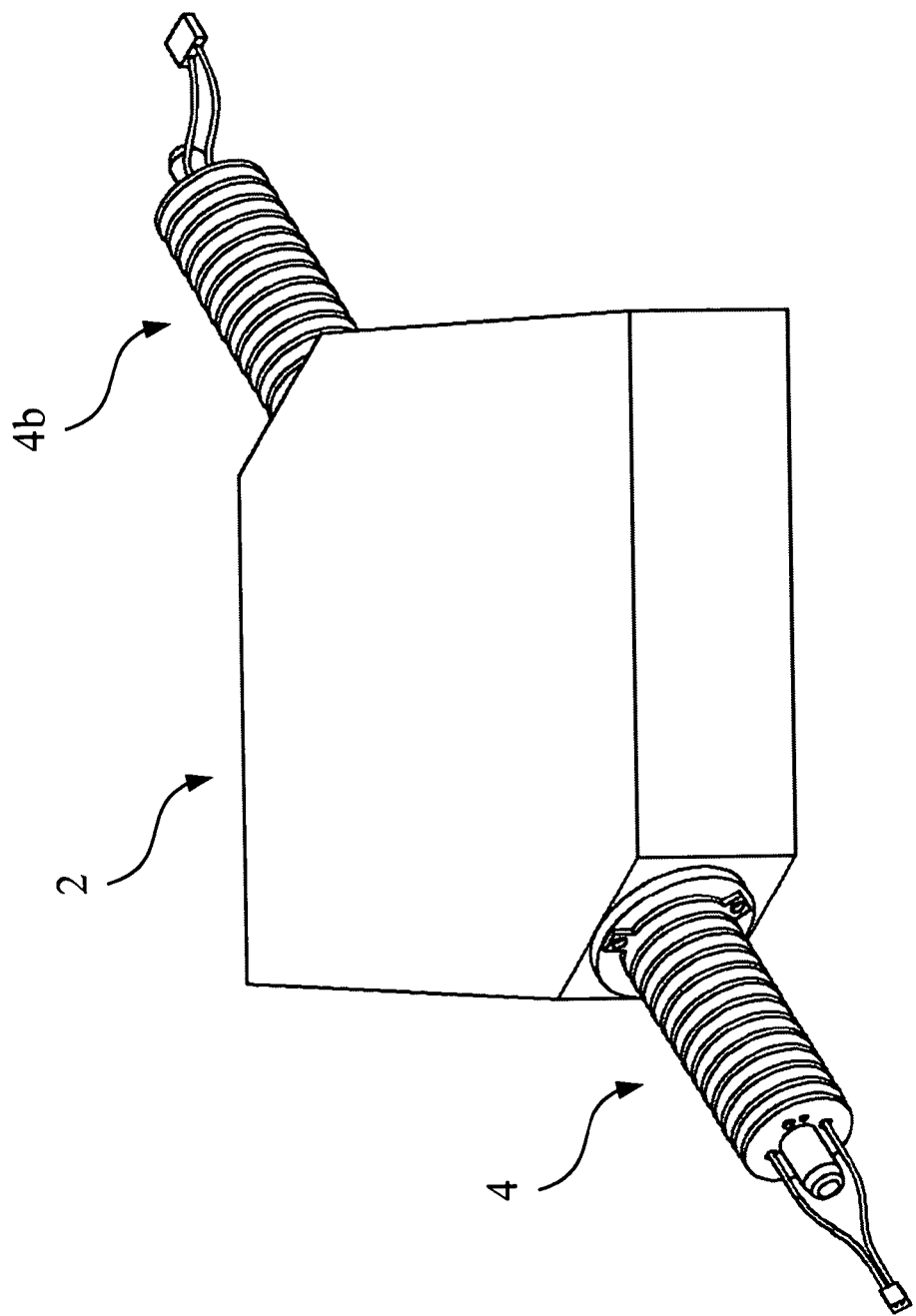
FIG. 4 is a schematic diagram of the light-guiding plate for the light-guiding device of another preferred embodiment according to the invention.

In another preferred embodiment, the light-guiding device is a tubular device, a cylindrical device, or a light-guiding plate. Referring to FIG. 4, FIG. 4 is a schematic diagram of the light-guiding plate 2 for the light-guiding device. The light-guiding plate 2 is a cubic object with two opposite corners modified into two opposite planes. The first packaged system 4 and the second packaged system 4b are mounted on the two opposite planes. The light-guiding plate 2 is capable of guiding a single light, emitted into the diode light-emitting device in the packaged system, to the outside as a plane light source.

The invention provides a diode lamp where the heat conducting/dissipating modules and diode light-emitting device are packaged together and equipped with the light-guiding device. The heat generated by the light-emitting device can be dissipated to the atmosphere immediately by the heat-dissipating fins of the heat conducting/dissipating modules to greatly enhance the heat-dissipating efficiency. In addition, the light-guiding device is capable of guiding the light, emitted into the light-emitting device, to the outside in single or multiple directions to extend the point light source generated by the light-emitting device to a stable line or in a plane. Therefore, compared to the prior art, the system-in-package light-emitting diode of the invention, includes the light-guiding device, and it is more suitable for the application in the diode lamp illuminating device requiring high power, high efficiency, and large ambit performances.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A system-in-package, highly efficient and high power light-emitting diode lamp, comprising: a light-guiding device having a first end and a second end; and a first packaged system, mounted on the first end of the light-guiding device, comprising: a first heat conducting/dissipating module, comprising a first heat pipe with a flat top end and a periphery wall; at least one first heat-dissipating fin, being mounted on the periphery wall of the first heat pipe; a first diode light-emitting device, mounted only on the flat top end of the first heat pipe and capable of being electrically connected to a power supply, for converting a first electric energy supplied by the power supply into a first light; wherein when the first diode light-emitting device emits the first light, the first light enters into the light-guiding device approximately parallel to the first heat pipe and the heat generated during the light-emitting of the first diode light-emitting device is conducted by the first heat pipe from the flat top end thereof to the at least one first heat-dissipating fin, and then is dissipated by the at least one first heat-dissipating fin; and a first sleeve, one end of the first sleeve being adapted for the insertion of the first diode light-emitting device, and the other end of the first sleeve being adapted for the insertion of the first end of the light-guiding device; wherein the first diode light-emitting device comprises a first substrate, a first light-emitting module disposed on the first substrate, and two first electrodes disposed on the first substrate, the first substrate is only mounted on the flat top end of the first heat pipe; and a second packaged system, mounted on the second end of the light-guiding device, comprising: a second heat conducting/dissipating module, comprising a second heat pipe with a flat top end and a periphery wall; at least one second heat-dissipating fin being mounted on a the periphery wall of the second heat pipe; a second diode light-emitting device, mounted only on the flat top end of the second heat pipe and capable of being electrically connected to the power supply, for converting a second electric energy supplied by the power supply into a second light; wherein when the second diode light-emitting device emits the second light, the second light enters into the light-guiding device approximately parallel to the second heat pipe, and the heat generated during the light-emitting of the second diode light-emitting device is conducted by the second heat pipe from the flat top end thereof to the at least one second heat-dissipating fin, and then is dissipated by the at least one second heat-dissipating fin; and a second sleeve, one end of the second sleeve being adapted for the insertion of the second diode light-emitting device, and the other end of the second sleeve being adapted for the insertion of the second end of the light-guiding device; wherein the second diode light-emitting device comprises a second substrate, a second light-emitting module disposed on the second substrate, and two second electrodes disposed on the second substrate, the second substrate is only mounted on the flat top end of the second heat pipe.

2. The light-emitting diode lamp of claim 1, wherein the first light-emitting module and the second light-emitting module respectively comprise at least one light-emitting diode or at least one laser diode.

3. The light-emitting diode lamp of claim 1, wherein the first substrate and the second substrate respectively are formed of a semiconductor material, a metal material, a polymer material, or a ceramic material.

4. The light-emitting diode lamp of claim 1, wherein the first heat pipe and the second heat pipe are respectively formed of a copper material, an aluminum material or a material with high heat conductivity.

5. The light-emitting diode lamp of claim 1, wherein the light-guiding device is a tubular device, a cylindrical device, or a light-guiding plate.

* * * * *